United States Patent Office 3,209,460
Patented Oct. 5, 1965

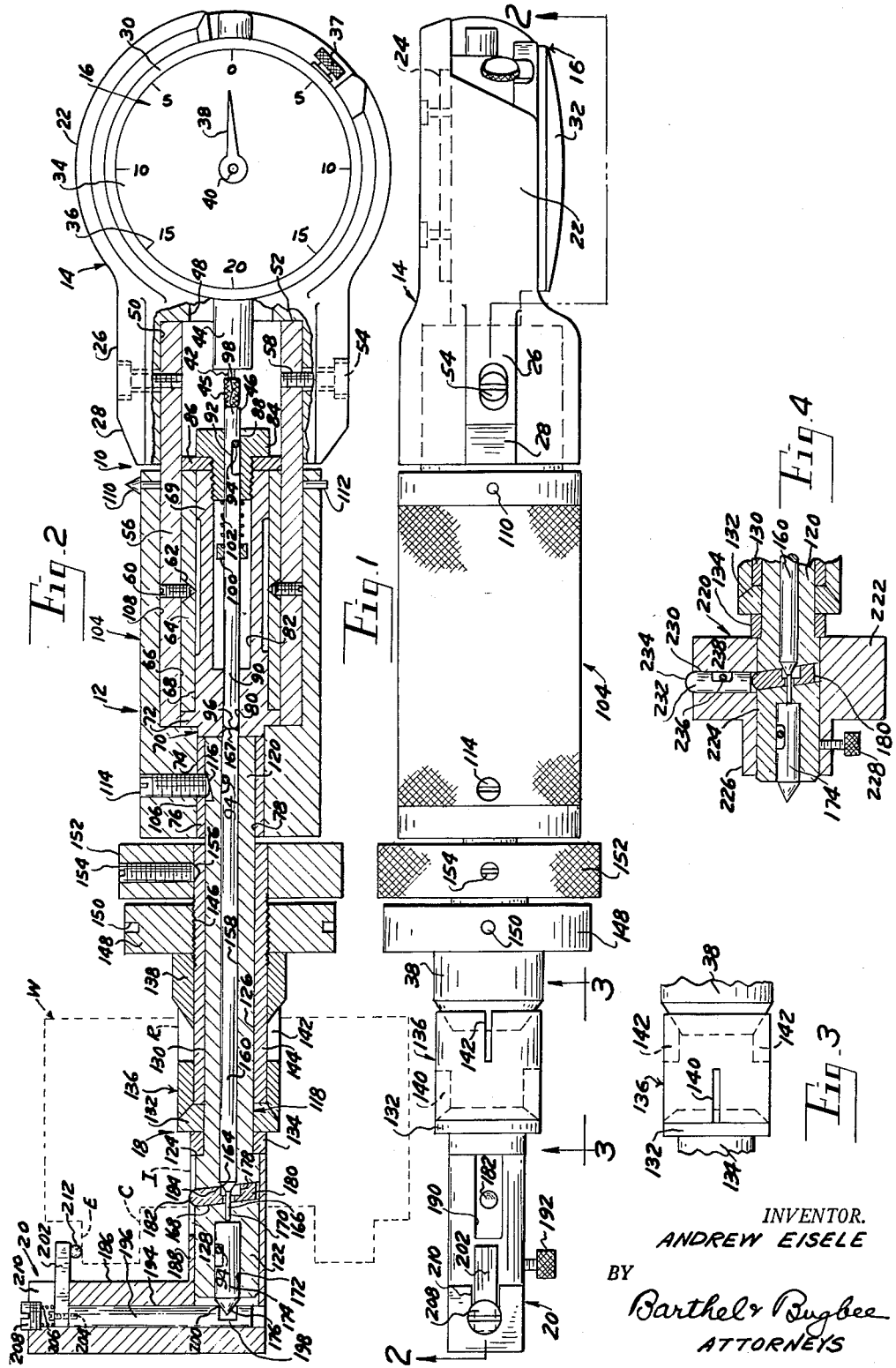

3,209,460
CONVERTIBLE BORE CONCENTRICITY GAUGE
Andrew Eisele, 15025 Cheyenne Ave., Detroit, Mich.
Filed Nov. 26, 1962, Ser. No. 239,903
6 Claims. (Cl. 33—174)

This invention relates to precision concentricity gauges and, in particular, to internal-and-external surface concentricity gauges.

One object of this invention is to provide an internal-and- external surface concentricity gauge which is adapted to measure the accuracy of concentricity of a bore or internal surface of one diameter relatively to a reference bore of another diameter and then to measure the accuracy of concentricity of an annular external surface relatively to the reference bore.

Another object is to provide an internal-and-external surface concentricity gauge of the foregoing character wherein the external surface concentricity is measured by means of an attachment to the bore concentricity gauge whereby the latter is utilized by itself for internal surface concentricity measurements and with the attachment for external surface concentricity measurements.

Another object is to provide an internal-and-external surface concentricity gauge of the foregoing character wherein the reference bore in the workpiece is snugly engaged by an expansible bushing portion on the intermediate part of the stem of the concentricity gauge, the forward part of which projects through the reference bore into the bore to be measured.

Another object is to provide an internal-and-external face concentricity gauge of the foregoing character wherein such concentricity measurements are made visible on a dial indicator located within a stationary handle forming a protecting shield.

Another object is to provide an internal-and-external surface concentricity gauge of the foregoing character which is adapted to measure a different range of bore concentricity by means of an enlarged bore measuring attachment which is detachably applied to the forward part of the stem of the bore concentricity gauge and utilizes the mechanism of the latter.

Other objects and advantages of the invention will become apparent during the course of the following description of the accompanying drawing, wherein:

FIGURE 1 is a top plan view of an internal-and-external surface concentricity gauge, according to one form of the invention, with the external surface concentricity measuring attachment applied thereto, and equipped with a horizontal handle holding a horizontal dial indicator;

FIGURE 2 is a vertical section, partly in side elevation, taken along the line 2—2 in FIGURE 1;

FIGURE 3 is a fragmentary side elevation looking in the direction of the line 3—3 in FIGURE 1; and FIGURE 4 is a fragmentary vertical section taken along the line 2—2 in FIGURE 1, but with an enlarged-bore concentricity-measuring attachment substituted for the external surface concentricity measuring attachment.

Referring to the drawing in detail, FIGURES 1 and 2 show an internal-and-external surface concentricity gauge, generally designated 10, according to one form of the invention, as consisting generally of a rotary concentricity measuring unit or structure 12 which at its rearward end is rotatably mounted upon a stationary dial indicator supporting structure 14 including a hollow horizontal stationary handle or dial indicator holder 22 containing a conventional horizontal dial indicator 16 positioned approximately in the plane through the axis of the rotary measuring unit 12. The rotary measuring unit 12 at its forward end is adapted to receive any one of a plurality of interchangeable rotary measuring heads, generally designated 18, of different diameters for fitting different sizes of bores, one only of the differently-sized but interchangeable measuring heads being shown in the drawings.

Adapted to be removably attached to each rotary measuring head 18 is an external surface concentricity measuring attachment, generally designated 20, shown in its attached position in FIGURE 2. The workpiece W which is to be measured for such concentricity has an enlarged reference bore or counterbore R relatively to which a smaller bore or internal surface I is intendedly coaxial. The bore I, in turn, is surrounded by an intendedly coaxial annular external surface E. The concentricity of the external surface E and the internal surface I are to be measured relatively to the reference bore R with the aid of the present instrument 10, first using the instrument 10 without the attachment 20 for measuring the concentricity of the internal surface I, and afterward installing the attachment 20 to measure the concentricity of the external surface E.

The hollow stationary handle 2 containing the dial indicator 16 is for the most part of approximately cylindrical shape containing an approximately cylindrical recess or socket 24 (FIGURE 1) which receives the dial indicator 16; and also includes a hollow tubular shank 26, also of roughly cylindrical shape but with its axis substantially perpendicular to the axis of the approximately cylindrical recess 24 for the dial indicator 16. The shank 26 is provided with a beveled annular end surface 28 adapted to carry reference marks (not shown) by which the rotation of the forward portion of the measuring unit 12 relatively to its rearward portion is indicated on the handle 2 attached to such rearward portion, as explained in more detail below.

The dial indicator 16 is of conventional design and consists of a generally cylindrical casing 30 containing a transparent crystal 32 covering a graduated rotatable dial 34 with a circular scale 36 locked in position by a thumb screw 37. Registering with the graduations 36 is a pointer 38 mounted on a rotary shaft 40 connected by conventional motion-multiplying mechanism (not shown) to a reciprocable dial indicator operating plunger 42 reciprocably mounted within a tubular stem 44 secured to and projecting radially from the casing 30 of the dial indicator 16. The plunger 42 terminates in a plunger head 45 with a rounded contact surface 46 at its outer end. Reciprocatory motion of the plunger 42 is registered on the scale 36 by the pointer 38, and the scale 36 is graduated in any convenient manner, such as in thousandths of an inch or ten-thousandths of an inch, in order to indicate the amount of the measurement, here the departure from concentricity of the internal surface I and/or the external surface E from the reference bore R of the workpiece W.

The handle 2 is provided with a bore 48 (FIGURE 2) leading from the recess 24 into a counterbore or socket 50 within the hollow shank 26, and separated from the bore 48 by a radial annular shoulder 52. The shank 26 is also drilled radially at circumferentially-spaced intervals, such as diametrically, to receive set screws 54. Seated within the counterbore 50 against the annular shoulder 52 is the rearward end of a tubular stationary barrel or rearward portion 56 of the stationary dial indicator supporting structure 14 similarly drilled and threaded as at 58 to receive the threaded shanks of the set screws 54 and thus be firmly but detachably connected to the handle 14. The barrel 56 is also drilled and threaded at diametrically opposite locations to receive headless set screws 60 which engage correspondingly-located conical indentations 62 in a stationary sleeve 64 which also forms a part of the stationary dial indicator supporting structure 14 and is thus snugly but removably held in a fixed location within the bore 66 of the barrel 56. The sleeve 64 in turn is snugly fitted over the cylindrical outer surface 68 of the rearward part 69 of a rotary tubular stem, forming a part of the rotary concentricity measuring structure 12, generally designated 70, against an annular flange 72 between the surface 68 and a larger diameter cylindrical forward surface 74, the flange 72 fitting snugly within the bore 66 of the barrel 56 at the forward end thereof. The cylindrical surface 68 is relieved intermediate its opposite ends to insure accuracy of fit.

The forward part 76 of the rotary tubular stem 70 carrying the enlarged diameter cylindrical surface 74 is provided with a counterbore 78 which is coaxial with and communicates with a bore 80 leading into a counterbore 82 within the rearward part 69 of the rotary tubular stem 70. The rearward end of the counterbore 82 is threaded to receive a flanged closure plug 84 passing through a stop washer 86 which retains the sleeve 64 in a fixed position. The plug 84 is provided with a bore 88 coaxial with the bore 80 and preferably of the same diameter so as to snugly but slidably receive a rearward motion-transmitting rod 90 reciprocably mounted therein. The rod 80 is provided with a flattened cutaway portion 92 engaged by a cross pin 94 to prevent rotation of the rod 90, the pin 94 being seated in the plug 84, which is drilled transversely for that purpose. The rearward motion-transmitting rod 90 has rounded forward and rearward contact ends 96 and 98 respectively, the latter being engageable with the contact surface 46 on the dial indicator plunger 42. Fixedly mounted on the rearward motion-transmitting rod 90 is a stop collar 100 for the forward end of a helical compression spring 102, the rearward end of which abuts the threaded plug 84.

Rotatably mounted upon the hollow tubular stem 70 is a tubular rotary handle, generally designated 104, containing a bore 106 rotatably slidably engageable with the cylindrical surface 74 on the forward part 76 of the stem 70; and also containing a counterbore 108 similarly snugly but rotatably slidably receiving the barrel 56. The rotary handle 104 is drilled at diametrically opposite locations near its rearward end to receive a sharp pointer 110 and a blunt pointer 112 respectively located near the beveled surface 28 and in line, as will be seen below, with the "feeler" of the measuring head 18. Near its forward end, the rotary handle 104 is drilled and threaded radially to receive a headless set screw 114 which also passed through the alignedly drilled forward part 76 of the stem 70 into the bore 78 therein. The set screw 114 engages a flat-bottomed notched 116 in the rearward end portion of the hollow body 118 of the measuring head 18. The body 118 (FIGURE 2) is provided with a reduced diameter rearward part 120 containing the notch 116, and an enlarged diameter forward part 122 separated from one another by an annular shoulder 124. The rearward and forward parts 120 and 122 of the body or stem 118 have external cylindrical surfaces 126 and 128 respectively, the rearward surface 126 snugly but removably fitting the bore or socket 78 in the forward part 76 of the stem 70, in which it is detachably held by the set screw 114 engaging the notch 116.

Rotatably mounted on the rearward part 120 of the stem 118 is an elongated sleeve 130 engaging at its forward end a conical collar 132 secured to the reduced diameter part 120 and engaging a washer 134 which in turn abuts the annular shoulder 124 (FIGURE 2). Mounted on the sleeve 130 coaxial therewith is an expansible sleeve or bushing 136 having internally conical forward and rearward ends engaging the externally-conical forward collar 132 and an externally conical rearward collar 138 which serves as an expander for the expansible bushing. 136 The latter, for expansibility, is provided with diametrically-paired forward and rearward slots 140 and 142 respectively. The rearward paired slots 142 are spaced circumferentially 90 degrees away from the plane containing the forward slots 140 (FIGURES 1 and 3), and the inner ends of the slots 140 and 142 terminate near the same radial plane or, in other words, extend inwardly longitudinally from their respective forward and rearward ends into slightly less than overlapping relationship.

The expander collar 138 is slidably mounted on the external surface 144 of the sleeve 130, which is threaded as at 146 along its rearward end portion to receive an internally-threaded adjusting nut 148. The latter has spanner holes 150 in the periphery thereof for the reception of a conventional spanner by which the nut 148 can be rotated to move the expander collar 138 lengthwise of the sleeve 130 and thereby expand the expansible bushing 136 so as to snugly fit the reference bore R. In order to hold the sleeve 130 stationary while rotating the nut 148, the sleeve 130 is provided with an externally-knurled hand wheel 152 which is bored to receive the external surface 144 of the sleeve 130 and is bored and threaded radially to receive a headless set screw 154 engaging a conical indentation 156 in the sleeve 130.

The rearward part 120 of the stem 118 is provided with a longitudinal bore 158 coaxial with the bore 80 in the rotary stem 70 and snugly but slidably receiving a forward motion-transmitting rod 160 having a rounded rearward end 162 engageable with the rounded forward end 96 of the rearward motion-transmitting rod 90. The forward motion-transmitting rod 160 is provided with a forward conical surface 164 extending forwardly to an elongated reduced diameter extension 166. The extension 166 passes across a transverse bore 168 in the enlarged diameter forward part 122 of the stem or measuring head body 118 and through a reduced diameter supplementary bore 170 which it snugly but slidably fits, and terminates within an enlarged supplementary longitudinal bore 172 within the forward end part 122. Snugly but slidably mounted in the enlarged longitudinal bore 172 is a supplementary longitudinal motion-transmitting or motion-converting pin 174 having a conical forward end 176 projecting forwardly from the forward end of the stem or measuring head body 118.

The reduced diameter extension 156 of the forward motion-transmitting rod 160 is rounded at its forward ends to engage the flat rearward end of the motion-converting pin 174, and passes through a lateral notch 178 intermediate the opposite ends of a transverse measuring pin or feeler element 180 which is snugly but slidably mounted in the transverse bore 168 and has a rounded bore-contacting end 182. The axis of the transverse bore 168 is not precisely perpendicular to the axis of the longitudinal bore 158 containing the motion-transmitting rod 160, but it is tilted at an angle of approximately two degrees more than right angle, or approximately 92 degrees to the axis of the bore 158 in order to facilitate sliding of the measuring pin 180 during measurement. This tilt is exaggerated in FIGURES 2 and 4 in order to show it more clearly. The lateral notch 178 receives the conical portion 164 of the forward measuring rod 160 at a sharp contact edge 184, and the pin 180 beyond the lateral notch 178 is bored laterally for the free passage of the extension 166, with a sufficient clearance to permit transverse motion of the measuring pin 180. Both the forward motion-transmitting rod 160 and motion-converting pin 174 are longitudinally recessed and the stem 118 drilled transversely to receive transverse rotation-preventing pins 94 similar to the pin 94 of the rod 90.

The external surface concentricity measuring attachment 20 (FIGURES 1 and 2) and includes an approximately rectangular block 186 having a tubular ferrule or mounting sleeve 188 secured thereto and slotted as at 190 for the clearance of the end 182 of the measuring pin 180. The sleeve 188 snugly but slidably receives the forward end portion 122 of the measuring head body or stem 118 and is drilled radially to receive a thumb screw 192 (FIGURE 1). The block 186 is bored lengthwise as at 194 with its axis perpendicular to the axis of the bore 172 to receive a motion-transmitting rod 196. The rod 196 contains a sharp-edged notch 198 having a contact edge 200 engageable with the conical surface 176 of the measuring pin 174. Mounted on the upper end of the motion-transmitting rod 196 at right angles thereto is a contact arm 202, the two being drilled and threaded to receive a set screw 204. A spring 206 urges the bar 202 and motion-transmitting rod 196 downward and abuts the plug 208 threaded into the upper end of the bore 194. A slot 210 is cut in the upper end of the block 186 for slidably receiving and guiding the bar 202, which has mounted on its lower side a contact ball 212 for engagement with the external surface E of the workpiece W.

Interchangeable with the external surface concentricity measuring attachment 20 (FIGURE 2) is a supplemental enlarged bore measuring device, generally designated 220 (FIGURE 4), consisting of a collar 222 having a bore 224 therein snugly but slidably receiving the external surface 128 of the forward part 122 of the measuring head body 118 and having a reduced diameter forward end portion 226 drilled radially to receive a thumb screw 228. The collar 222 is drilled radially as at 230 to receive an auxiliary measuring pin 232 provided with a rounded end 234 and flattened and recessed longitudinally as at 236 to receive a motion-limiting pin 238. The collar 222 is drilled along a chord direction to receive the pin 238.

In the operation of the invention, to check the concentricity of the bore I relatively to the reference bore R, the operator removes the external surface concentricity measuring attachment 20 from the forward part 122 after first loosening the thumb screw 192 and retracts the nut 148 by rotating it counterclockwise by means of a spanner inserted in the holes 150. He then thrusts the forward part 122 through the reference bore R and bore I to be measured, until the expansible sleeve or bushing 136 pushes the conical expander collar 138 and sleeve 136 forwardly, when he rotates the nut 148 in a clockwise direction. This action, because of the presence of the slots 140 and 142, expands the opposite end portions of the expansible sleeve 136 until these end portions snugly engage the reference bore R, thereby rendering the sleeve 144 temporarily immovable. In using the spanner (not shown) to rotate the nut 148 with one hand, the operator grasps the hand wheel 152 firmly in the other hand to prevent rotation of the sleeve 144 while expansion of the sleeve 136 is taking place.

The resulting engagement of the rounded end portion 182 of the transverse measuring pin 180 with the bore I depresses the measuring pin 180 within the transverse bore 168 and the transverse motion of the sharp edge 184 of the recess 178 acting upon the conical portion 164 of the forward motion-transmitting rod 160 shifts the latter rearwardly and consequently shifts the rearward motion-transmitting rod 90 and dial indicator plunger 42 in a similar rearward direction, thereby swinging the pointer 38 relatively to the graduations 36 on the dial 34. By loosening the thumb screw 37 and rotating the dial 34, the zero graduation of the graduated scale 36 can be set at any desired location relatively to the pointer 38. Grasping the stationary horizontal handle 22 of the dial indicator supporting structure 14 in one hand to hold it stationary, the operator with his other hand grasps the tubular rotary handle 104 which, through its connection by the set screw 114 and flattened portion 116 rotates the stem 118, thereby causing the rounded end 182 of the transverse measuring pin or feeler 180 to trace out a circular path on the surface of the bore I. During this action, any departure from concentricity of the bore I relatively to the reference bore R is indicated by a swinging to and fro of the needle or pointer 38 relatively to the graduated scale 36 of the dial indicator 16, the amount of deviation being indicated by the extent of swing of the pointer 38 on the graduated scale 36.

To measure the concentricity of the external surface E relatively to the reference bore R, with the instrument 10 remaining in its above-described position with the expansible sleeve 136 still tightly gripping the reference bore R, the operator slides the ferrule 188 upon the forward part 122 of the stem 118 and secures it in position by tightening the thumb screw 192 (FIGURE 1). This action causes the contact ball 212 to engage the external surface E to be measured, moving the contact arm 202 and motion-transmitting rod 196 outward, consequently causing one of the sharp edges 200 of the recess 198 thereof to engage the conical end portion 176 of the pin 174. This action pushes the pin 174 inward, with consequent inward motion of the extension 166, forward and rearward motion-transmitting rods 160 and 90 and dial indicator plunger 42, swinging the needle or pointer 38 of the dial indicator 16 relatively to the graduated scale 36 as before. In the manner previously described, the operator again holds the handle 14 stationary while rotating the tubular rotary handle 103 so as to cause the contact ball 212 to trace an annular path around the annular external surface E of the workpiece W. Any deviation from concentricity of the external surface E relatively to the reference bore R is, as before, indicated by swinging of the dial indicator needle or pointer 38 relatively to the graduated scale 36 thereof.

To measure the concentricity of a counterbore C relatively to the reference bore R, the operator removes the external surface concentricity measuring attachment 20 by loosening the thumb screw 192 and replaces it by the supplemental enlarged bore measuring device 220 (FIGURE 4). As this occurs, the measuring pin or feeler 232 of the device 220 moves downward within its transverse bore 230 when the rounded end 234 thereof engages the counterbore C, consequently depressing the transverse measuring pin or feeler 180. This causes swinging of the dial indicator pointer or needle 38 by the motion transmitted to its plunger 42 through the motion-transmitting rods 160 and 90. By holding the handle 22 stationary and rotating the rotary handle 104, the operator traces out a circular path within the counterbore C in the manner previously described for the bore I, any deviation from concentricity being indicated by the extent of swing of the pointer 38 relatively to the graduated scale 36 of the dial indicator 16.

To remove the instrument from the workpiece W, the operator reverses the procedure described above, first removing the external surface concentricity measuring attachment 20 or supplemental bore measuring device 220, if either happens to be mounted, at the moment, upon the forward part 122 of the stem 118, and then loosens the expansible sleeve 136 by rotating the nut 148 counterclockwise upon the threaded portion 146 while holding the hand wheel 152 stationary, thereby retracting the conical expander collar 138 to the right and causing the expansible bushing 136 to likewise move to the right and return to its smaller diameter from which it had been expanded by reason of the slots 140 and 142. The operator is then enabled to pull the instrument 10 to the right and withdraw its forward portion from the workpiece W. Subsequent measurements upon other workpieces are made in a manner similar to that described above.

What I claim is:

1. A bore concentricity gauge convertible to external surface concentricity measurement and for use with a conventional dial indicator having a reciprocable operating plunger, said gauge comprising a stationary dial indicator supporting structure having a rearward longitudinal passageway therethrough communicating with the dial indicator plunger and having at its rearward end a dial indicator holder, a rotary concentricity measuring structure rotatably mounted on said stationary structure and having a forward longitudinal passageway therethrough communicating with said rearward longitudinal passageway, said rotary measuring structure having a forward part with a transverse bore therein communicating with said forward longitudinal passageway and a reference bore fitting portion configured to engage and fit a workpiece concentricity reference bore, a bore concentricity feeler element reciprocably mounted in said transverse bore and having a lateral cutaway portion extending thereacross, motion-transmitting mechanism including a forward longitudinal motion-transmitting member reciprocably mounted in said longitudinal passageways in operative engagement with the dial indicator plunger, transverse-to-longitudinal motion-converting means disposed partly upon said feeler element and partly upon said motion-transmitting mechanism and responsive to transverse motion of said feeler element to effect longitudinal motion of said motion-transmitting mechanism, said forward part projecting forwardly beyond said transverse bore and having a supplementary longitudinal passageway therethrough communicating with said previously-mentioned forward longitudinal passageway and with said transverse bore adjacent the lateral cutaway portion of said bore concentricity feeler element, and a supplementary motion-transmitting member reciprocably mounted in said supplementary passageway, one of said longitudinal motion-transmitting members having a projection thereon extending through said lateral cutaway portion of said feeler element into operative engagement with the other longitudinal motion-transmitting member.

2. A bore concentricity gauge convertible to external surface concentricity measurement and for use with a conventional dial indicator having a reciprocable operating plunger, according to claim 1, wherein a laterally-extending support is detachably mounted on said forward portion of said measuring structure and has a passageway therein disposed transversely to said longitudinal passageways, wherein an external surface concentricity measuring element is movably mounted in said transversely-disposed passageway, and wherein transverse-to-longitudinal motion-converting mechanism is disposed partly upon said external surface concentricity measuring element and partly upon said motion-transmitting mechanism and is responsive to transverse motion of said last-mentioned measuring element to effect longitudinal motion of said motion-transmitting mechanism.

3. A bore concentricity gauge, according to claim 2, wherein said external surface concentricity measuring element includes a projection extending transversely to said support and having an external surface-contacting portion thereon.

4. A bore concentricity gauge, according to claim 3, wherein said external surface concentricity measuring element also includes a motion-transmitting member reciprocably mounted in said support and connected to said projection.

5. A bore concentricity gauge for use with a conventional dial indicator having a reciprocable operating plunger, said gauge comprising a stationary dial indicator supporting structure having a rearward longitudinal passageway therethrough communicating with the dial indicator plunger and having at its rearward end a dial indicator holder, a rotary concentricity measuring structure rotatably mounted on said stationary structure and having a forward longitudinal passageway therethrough communicating with said rearward longitudinal passageway, said rotary measuring structure having a forward part with a transverse bore therein and a reference bore fitting device configured to engage and fit a workpiece concentricity reference bore, a bore concentricity measuring member reciprocably mounted in said transverse bore and having a feeler portion thereon, motion-transmitting mechanism reciprocably mounted in said longitudinal passageways in operative engagement with the dial indicator plunger, transverse-to-longitudinal motion-converting means disposed partly upon said measuring member and partly upon said motion-transmitting mechanism and responsive to transverse motion of said measuring member to effect longitudinal motion of said motion-transmitting mechanism, a supplementary bore-concentricity measuring element mount detachably secured to the forward portion of said rotary measuring structure, said mount having a transverse passageway therein communicating with said transverse bore, and a supplementary measuring element reciprocably mounted in said transverse passageway in engagement with said concentricity measuring member.

6. A bore concentricity gauge, according to claim 5, wherein the inner end of said transverse passageway is disposed in registry with the outer end of said transverse bore.

References Cited by the Examiner

UNITED STATES PATENTS

| 2,766,532 | 10/56 | Eisele | 33—174 |
| 2,884,699 | 5/59 | Eisele | 33—174 |
| 3,030,709 | 4/62 | Eisele | 33—174 |

FOREIGN PATENTS 946,577  12/48  France.

ISAAC LISANN, *Primary Examiner.*